United States Patent
Machi et al.

(10) Patent No.: US 9,325,244 B2
(45) Date of Patent: Apr. 26, 2016

(54) POWER SUPPLY SYSTEM

(71) Applicant: DENSO CORPORATION, Kariya, Aichi-pref. (JP)

(72) Inventors: Tatsuya Machi, Nagoya (JP); Hiroki Komura, Kasugai (JP); Katsutoyo Misawa, Kariya (JP); Keisuke Tanigawa, Nishio (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 13/657,021

(22) Filed: Oct. 22, 2012

(65) Prior Publication Data
US 2013/0099559 A1  Apr. 25, 2013

(30) Foreign Application Priority Data
Oct. 21, 2011 (JP) ................................. 2011-231322

(51) Int. Cl.
*H02J 1/10* (2006.01)
*H02M 3/335* (2006.01)
*H02M 3/28* (2006.01)

(52) U.S. Cl.
CPC ............... *H02M 3/335* (2013.01); *H02J 1/102* (2013.01); *H02M 3/285* (2013.01)

(58) Field of Classification Search
CPC ..................................................... H02J 1/102
USPC .......................................... 307/32, 35, 82, 52
See application file for complete search history.

(56) References Cited

U.S. PATENT DOCUMENTS

| 6,157,555 | A  | * | 12/2000 | Hemena .................... H02J 1/10 307/55 |
| 6,166,934 | A  | * | 12/2000 | Kajouke et al. ................. 363/65 |
| 6,809,678 | B2 | * | 10/2004 | Vera et al. ..................... 341/166 |
| 6,822,426 | B1 | * | 11/2004 | Todd ....................... H02J 1/102 323/269 |
| 7,312,962 | B1 | * | 12/2007 | Zansky .................... H02H 9/02 361/18 |
| 8,089,177 | B2 | * | 1/2012 | Kato ............................ 307/10.1 |
| 2004/0245970 | A1 | * | 12/2004 | Todd et al. ..................... 323/272 |
| 2012/0169311 | A1 | * | 7/2012 | Malmberg et al. ............. 323/272 |
| 2012/0297104 | A1 | * | 11/2012 | Thottuvelil .......... G06F 13/4004 710/305 |

FOREIGN PATENT DOCUMENTS

| JP | 61-227639 | 10/1986 |
| JP | 01-222659 | 9/1989 |
| JP | 2-065666 | 3/1990 |

(Continued)

*Primary Examiner* — Adi Amrany
(74) *Attorney, Agent, or Firm* — Nixon & Vanderhye PC (57) ABSTRACT

A power supply system includes a plurality of DC-DC converters and at least one operating unit. The DC-DC converters are connected in parallel to one another. The at least one operating unit operates the DC-DC converters such that power is supplied through the DC-DC converters to a predetermined power-supplied object. The at least one operating unit includes a voltage controller, a current limiter, and an increasing unit. The voltage controller operates the DC-DC converters such that output voltages thereof are controlled to be respective target voltage. The current limiter limits output currents of the DC-DC converters so that they are limited with respect to a respective specified value. The increasing unit increases a specified value for at least one DC-DC converter of the DC-DC converters, when all of the plurality of DC-DC converters are activated and output current of at least one other DC-DC converter of the DC-DC converters reaches a specified value for the at least one other DC-DC converter.

23 Claims, 3 Drawing Sheets

(56) References Cited

FOREIGN PATENT DOCUMENTS

| | | |
|---|---|---|
| JP | 7-039151 | 2/1995 |
| JP | 7-059348 | 3/1995 |
| JP | 7-312867 | 11/1995 |
| JP | 8-126315 | 5/1996 |
| JP | 10-108362 | 4/1998 |
| JP | 10-191624 | 7/1998 |
| JP | 10-225126 | 8/1998 |
| JP | 10-248253 | 9/1998 |
| JP | 2001-037210 | 2/2001 |
| JP | 2004-328885 | 11/2004 |
| JP | 2006-262549 | 9/2006 |

* cited by examiner

FIG.3A OUTPUT VOLTAGE

FIG.3B TOTAL OUTPUT CURRENT

FIG.3C OUTPUT CURRENT OF MASTER

FIG.3D OUTPUT CURRENT OF SLAVE

FIG.3E OVERCURRENT LIMITING SIGNAL

POWER SUPPLY SYSTEM

CROSS-REFERENCE TO RELATED APPLICATION

This application is based on and claims the benefit of priority from earlier Japanese Patent Application No. 2011-231322 filed Oct. 21, 2011, the description of which is incorporated herein by reference.

BACKGROUND

1. Technical Field

The present invention relates to a power system including an operating unit which operates a plurality of DC (direct current) to DC converters (hereinafter referred to as DC-DC converters) connected in parallel to each other in such a way that power is supplied through the DC-DC converters to a predetermined power-supplied object.

2. Related Art

In a well-known power supply system, a plurality of switching power supplies (DC-DC converters) are connected in parallel to one another so as to supply power to a predetermined power-supplied object. The purpose of using this system is to increase a maximum current that can be supplied to the power-supplied object. In this system, current is outputted to the power-supplied object preferentially from a switching power supply having a higher output voltage among the plurality of switching power supplies. Accordingly, for example, some specific switching power supplies may have a higher frequency of being activated. Thus, reliability tends to be lower in a part of the switching power supplies than in other switching power supplies.

In order to cope with this, in a well-known technique as disclosed in JP-A-10-225126, current to be supplied to loads is equally shared between a plurality of switching power supplies connected in parallel to each other. Specifically, in this technique, a reference current is defined such as to be an average of the total output current of the plurality of switching power supplies. If a switching power supply has an output current larger than the reference current, the output current of the switching power supply is reduced. With this configuration, the output current of each of the switching power supplies is controlled to the reference current.

Further, in another well-known technique as disclosed in JP-A-10-248253, the larger the output current of a switching power supply becomes within a range of its rated output current, the more the output voltage of the switching power supply is reduced. With these techniques, reliability of the power supply system is enhanced.

For example, a technique of enhancing reliability of a power supply system having a plurality of switching power supplies connected in parallel to each other is also disclosed in JP-A-10-108362.

The techniques set forth above are able to enhance reliability of a power supply system but may have several inconveniences. Specifically, in the technique disclosed in JP-A-10-225126, a signal line is required to be used. The signal line is connected to the switching power supplies to share a signal, which is associated with the reference current, between the switching power supplies. Therefore, the cost and size of the power supply system may be increased.

In the technique disclosed in JP-A-10-248253, when the current to be supplied to loads becomes large, the output voltage of the switching power supplies tends to be reduced. Therefore, for example, there is a concern that, in charging a battery with the switching power supplies, the battery is not necessarily appropriately charged. In this way, there is still room for improvement in the techniques for enhancing reliability of a power supply system that includes a plurality of switching power supplies connected in parallel to each other.

SUMMARY

An exemplary embodiment provides a power supply system which is able to enhance its reliability.

According to an exemplary aspect of the present disclosure, there is provided a power supply system comprising: a plurality of DC-DC converters (12a, 12b) that are connected in parallel to one another; and at least one operating unit that operates the plurality of DC-DC converters such that power is supplied through the plurality of DC-DC converters to a predetermined power-supplied object, wherein the at least one operating unit includes: a voltage controller that operates the plurality of DC-DC converters such that output voltages thereof are controlled to be respective target voltage; a current limiter that operates the plurality of DC-DC converters such that output currents thereof are limited to respective specified value, when the output currents exceed the respective specified value; and a specified value increasing unit that increases the respective specified value for at least one of the plurality of DC-DC converters, when output current of the at least one of the plurality of DC-DC converters exceeds the respective specified value.

In the above aspect of the exemplary embodiment, the specified value is increased by the specified value increasing unit using the above mode. With this configuration, when current to be supplied to the power-supplied object is small, the output current of each of the plurality of DC-DC converters is suppressed to not more than the specified value to thereby enhance reliability of the DC-DC converters. On the other hand, when current to be supplied to the current supply object is large, the specified value is increased using the above mode to thereby increase current that can be supplied to the power-supplied object. Thus, reliability of the power supply system is enhanced, while the maximum value of current that can be supplied to the power-supplied object is increased.

In the exemplary embodiment, the plurality of DC-DC converters may be different in the target voltage from one another, and which may include a master and at least one slave. The master is a DC-DC converter having a highest target value among the plurality of DC-DC converters. The at least one slave is the remaining at least one DC-DC converter other than the master among the plurality of DC-DC converters. The specified value increasing unit may increase the specified value for at least one DC-DC converter among the plurality of DC-DC converters other than a first slave having a lowest target value among the at least one slave, when output current of the first slave exceeds the specified value for the first slave.

In the above aspect of the exemplary embodiment, current is outputted, first, to a power-supplied object from a DC-DC converter having a highest target voltage. Then, when the output current of the DC-DC converter having a highest target voltage exceeds the specified value suitable for the DC-DC converter, the output current of the DC-DC converter having a highest target voltage is limited by the specified value, thereby reducing the output voltage of the DC-DC converter. After that, current is outputted to the power-supplied object from the DC-DC converters other than the DC-DC converter having a highest target voltage, in descending order of target voltages. Thus, the activation states of the DC-DC converters can be detected according to the current to be supplied to the power-supplied object.

Further, in the above aspect of the exemplary embodiment, when the power supply system includes two DC-DC converters, the "slave having a lowest target voltage among the slaves" corresponds to the DC-DC converter which is not the master among the two DC-DC converters.

In the exemplary embodiment, the plurality of DC-DC converters may be different in the target voltage from one another, and include a master and at least one slave. The master is a DC-DC converter having a highest target value among the plurality of DC-DC converters. The slave is the remaining at least one DC-DC converter other than the master among the plurality of DC-DC converters. The specified value increasing unit may increase the specified value for at least one DC-DC converters among the plurality of DC-DC converters other than a first slave having a lowest target value among the plurality of DC-DC converters, when output voltage of the at least one DC-DC converters other than the first slave becomes lower than that of the first slave.

In the above aspect of the exemplary embodiment, current is outputted, first, to a power-supplied object from a DC-DC converter having a highest target voltage. Then, when the output current of the DC-DC converter having a highest target voltage exceeds the specified value suitable for the DC-DC converter, the output current of the DC-DC converter having a highest target voltage is limited to the specified value, thereby reducing the output voltage of the DC-DC converter. After that, current is outputted to the power-supplied object from the DC-DC converters other than the DC-DC converter having a highest target voltage, in descending order of target voltages. Thus, the activation states of the DC-DC converters can be detected according to the current to be supplied to the power-supplied object.

In the occurrence of a fault, such as a fault in a signal line (e.g., disconnection) for transmitting information between a master and a slave, appropriate information transmission is disable between the plurality of DC-DC converters. In this case, for example, the output current of at least any one of the plurality of DC-DC converters is limited to the specified value. It is difficult for other DC-DC converters to detect that the DC-DC converter in question is in a state of being limited in its output current by the specific value. Accordingly, there is a concern that the specified value increasing unit is not able to timely increase the specified value. Further, in this case, there is a concern that the output voltage of the DC-DC converters is drastically reduced.

In this regard, in the above aspect of the exemplary embodiment, when the output voltage of at least one of the DC-DC converters other than a slave having a lowest target voltage among the plurality of DC-DC converters becomes lower than the output voltage of the slave having a lowest target voltage, the specified value suitable for the at least one of the DC-DC converters other than the slave having a lowest target voltage among the plurality of DC-DC converters is increased. Thus, the output voltage of the DC-DC converters is appropriately prevented from being reduced.

In the exemplary embodiment, the specified value related to the master may be set to be lower than the specified value related to the slave having the lowest target.

Of the DC-DC converters included in the power supply system, the master has a highest target voltage and thus the master tends to be more frequently activated. In this regard, in the above aspect of the exemplary embodiment, specified values are set, in the above mode, which are suitable for the master and a slave having a lowest target voltage. Accordingly, under the condition where current to be supplied to a power-supplied object becomes large, current to be supplied to the power-supplied object can also be covered, as early as possible, by the slave having a lowest target voltage. Thus, current passing through the master is prevented, as much as possible, from becoming large. Further, the reliability of the power supply system is appropriately enhanced.

In the above aspect of the exemplary embodiment, a current value (average current) may be used as a specified value suitable for the master, if the current value can guarantee the reliability of the master until an integrated activation time period of the master reaches a specified time period.

In the exemplary embodiment, the at least one operating unit may be provided for each of the plurality of DC-DC converters, and which may operate the respective DC-DC converter provided with the at least one operating unit itself The specified value increasing unit is provided for at least one DC-DC converter other than a first DC-DC converter having a lowest target value among the plurality of DC-DC converters. Each of the plurality of DC-DC converters may be provided with an interface. The power supply system may further comprise an outputting unit that, when output current of the first DC-DC converter exceeds the specified value for the first DC-DC converter, externally outputs information related to its situation via the interface related to the first DC-DC converter. The specified value increasing unit may increase the specified value related to the respective DC-DC converter provided with the specified value increasing unit itself under a condition that the information is received via the interface related to the respective DC-DC converter.

For example, a pin terminal may be used as the interface.

In the exemplary embodiment, the at least one operating unit may be provided for each of the plurality of DC-DC converters, and which may operate the respective DC-DC converter provided with the at least one operating unit itself The power supply system and the power-supplied object may be mounted in a vehicle provided with a controller that performs overall control of the vehicle. The power supply system may further comprise a notifying unit that, when output currents of the plurality of DC-DC converters exceed the respective specified value, notifies the controller of information related to its situation.

In the above aspect of the exemplary embodiment, the notifying unit is provided to notify the controller that performs overall control of the vehicle, of its situation in which the output current of the DC-DC converter has exceeded the specified value. Then, for example, the controller may be permitted to perform a process of limiting current to be supplied to the power-supplied object. In the above aspect of the exemplary embodiment, the controller may be located at an upper level than the at least one operating unit. The term "upper level" refers to an upstream side with reference to the at least one operating unit when a user's request inputted form the user's interface is an extreme upstream.

DETAILED DESCRIPTION OF THE PREFERRED EMBODIMENTS

With reference to the accompanying drawings, hereinafter is described an embodiment of a power supply system of the present invention. In the embodiment, the power supply system of the present invention is applied to a large hybrid vehicle (e.g., bus) having a rotary machine and an engine as on-vehicle main machinery.

Figure 1:
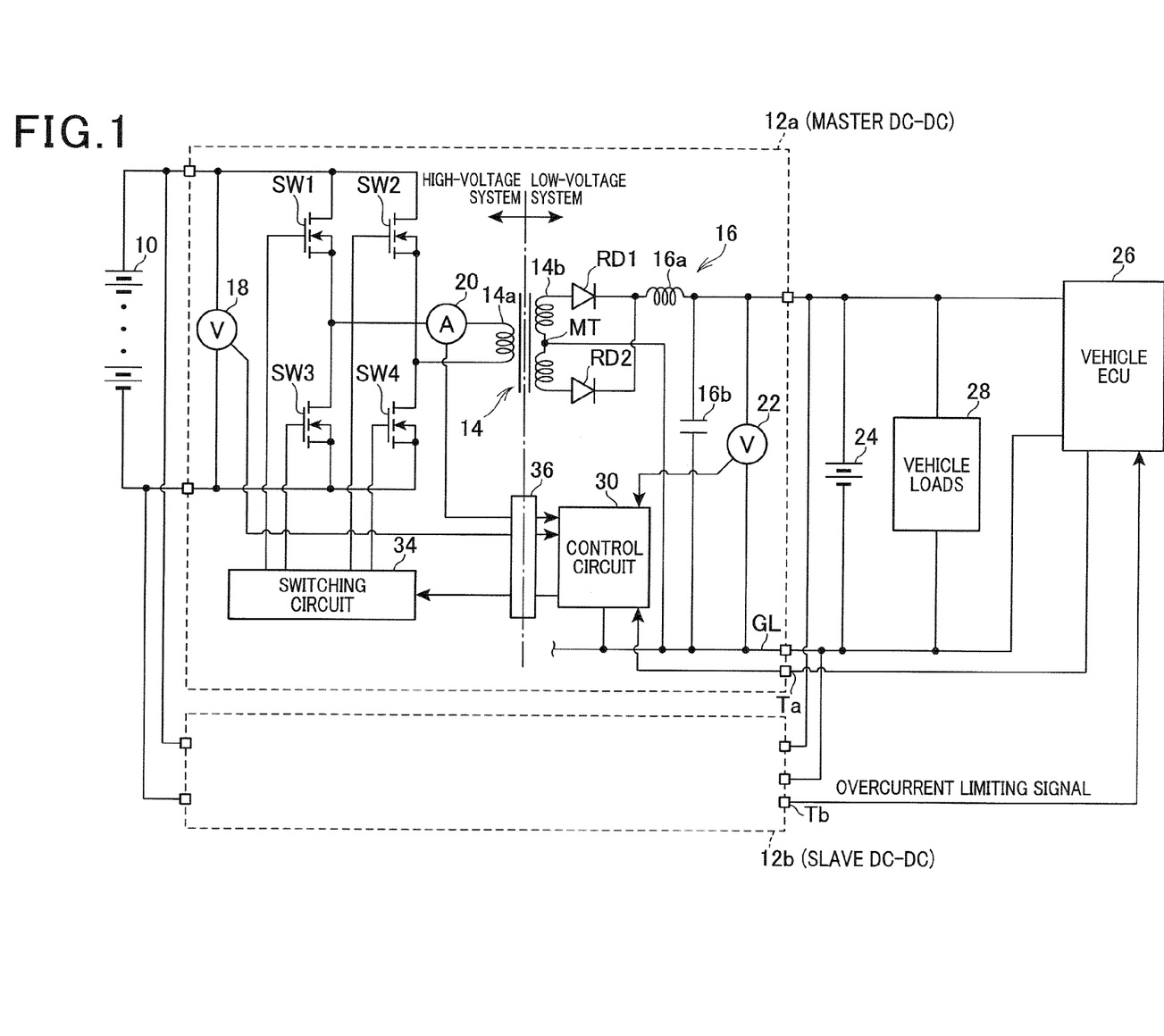
FIG. 1 is a schematic diagram showing a power supply system in general according to an embodiment of the present invention.

FIG. 1 is a schematic diagram illustrating a power supply system in general according to the embodiment.

As shown in FIG. 1, the power supply system includes a high-voltage battery 10. The high-voltage battery 10 serves as a power supply for a rotary machine (motor-generator), not shown, as on-vehicle main machinery. For example, the high-voltage battery 10 has a predetermined high voltage of several hundred volts or more. For example, a lithium-ion battery or a nickel-hydrogen battery is usable as the high-voltage battery 10.

The high-voltage battery 10 can be connected to each of a plurality of (two) DC-DC converters 12a and 12b which are connected parallel to each other. In the present embodiment, hereinafter, the DC-DC converter 12a is referred to as a master DC-DC and the DC-DC converter 12b is referred to as a slave DC-DC.

The master DC-DC 12a includes a parallel connection (full-bridge circuit) and a transformer 14. In the parallel connection, a serial connection of switching elements SW1 and SW3 is connected in parallel to a serial connection of switching elements SW2 and SW4. The master DC-DC 12a serves as an insulation type converter that steps down the voltage of the high-voltage battery 10 and outputs the stepped down voltage. In the present embodiment, N-channel MOS transistors are used as the switching elements SW1 to SW4.

The switching elements SW1 and SW2 on a high-potential side have input terminals (drains) connected to the positive side of the high-voltage battery 10. The switching elements SW3 and SW4 on a low-potential side have output terminals (sources) connected to the negative side of the high-voltage battery 10. Although not shown, in each of the switching elements SW1 to SW4, a freewheel diode is connected between the input and output terminals.

The transformer 14 includes a primary-side coil 14a having ends each connected to a connecting point between the switching elements SW1 and SW3 and a connecting point between the switching elements SW2 and SW4.

The transformer 14 also includes a secondary-side coil 14b having ends connected to respective anodes of diodes RD1 and RD2. Cathodes of the diodes RD1 and RD2 are short circuited. The diodes RD1 and RD2 are connected to a smoothing circuit 16 (LC filter) composed of a reactor 16a and a capacitor 16b.

The primary side of the high-voltage battery 10 and the master DC-DC 12a compose an on-vehicle high-voltage system which is insulated from a ground line GL connected to a casing, not shown, of the master DC-DC 12a. On the other hand, the secondary side of the master DC-DC 12a composes an on-vehicle low-voltage system which operates with reference to the ground line GL.

Accordingly, in the present embodiment, a mid-point tap MT of the secondary-side coil 14b of the transformer 14 is connected to the ground line GL. With this configuration, the diodes RD1 and RD2 alternately output ½ of the voltage across the secondary-side coil 14b, depending on whether the high-potential side switching element SW1 and the low-potential side switching element SW4 are in an on-state, or whether the high-potential side switching element SW2 and the low-potential side switching element SW3 are in an on-state. It should be appreciated that the mid-point tap MT is a terminal connected to the center of the secondary-side coil 14b of the transformer 14 (a mid point located at an equal distance from both terminals of the coil 14b).

The master DC-DC 12a includes, on its primary side, an input-side voltage sensor 18 that detects an input voltage of the full-bridge circuit and an input-side current sensor 20 that detects a current passing through the primary-side coil 14a of the transformer 14. The master DC-DC 12a also includes, on its secondary side, an output-side voltage sensor 22 that detects an output voltage of the master DC-DC 12a (output voltage of the smoothing circuit 16).

In the present embodiment, the master DC-DC 12a and the slave DC-DC 12b are identical with each other in the structure and function. Accordingly, in FIG. 1, the internal structure of the slave DC-DC 12b is omitted.

In the present embodiment, the master DC-DC 12a is connected in parallel with the slave DC-DC 12b. This parallel-connection configuration can increase the maximum value of the total output current of the master DC-DC 12a and the slave DC-DC 12b. In other words, the parallel-connection configuration can cope with the tendency that the current to be supplied to on-vehicle loads 28 described later becomes large due to the application of the power supply system of the present embodiment to a large vehicle.

The parallel connection of the master DC-DC 12a and the slave DC-DC 12b has an output side connected to a parallel connection of a low-voltage battery 24, a vehicle ECU (electronic control unit) 26 and the on-vehicle loads 28 (excepting the vehicle ECU 26). The low-voltage battery 24 configures a part of the low-voltage system and outputs a predetermined low voltage (e.g., 24 V). In the present embodiment, a lead battery is used as the low-voltage battery 24. More specifically, the present embodiment uses a serial connection of two lead batteries each having a voltage of 12 V across the terminals.

The on-vehicle loads 28 include an air conditioner for conditioning air in the vehicle interior (e.g., a fan and a heater included in the air conditioner), headlights, vehicle interior lighting and actuators (e.g., fuel injection valves) for driving the engine.

The vehicle ECU 26 includes a control circuit (corresponding to a controller that performs overall control of the vehicle) whose level is upper than a control circuit 30 (corresponding to at least one operating unit including a voltage controller, a current limiter, and a specified value increasing unit) provided in each of the master DC-DC 12a and the slave DC-DC 12b. In other words, the control circuit of the vehicle ECU 26 is on an upstream side when a user's request inputted from a user interface, such as an accelerator pedal, is at the extreme upstream position. The vehicle ECU 26 has a function of performing overall control of the vehicle, while having the low-voltage battery 24 as a power supply.

The control circuit 30 as well uses the low-voltage battery 24 as a power supply, while operating the switching elements SW1 to SW4 via a switching circuit 34 so that power is supplied to the low-voltage battery 24, the vehicle ECU 26 and the on-vehicle loads 28.

Specifically, the control circuit 30 calculates a manipulated variable (duty) for carrying out feedback control (voltage feedback control). Under the feedback control, the control circuit 30 controls an output voltage of the master DC-DC 12a detected by the output-side voltage sensor 22 to a target voltage. At the same time, the control circuit 30 calculates other manipulated variables when the output current of the master DC-DC 12a calculated from the output value of the input-side current sensor 20 has reached the specified value (master limit value Ia) of the master DC-DC 12a. These manipulated variables include a manipulated variable for performing constant current control and a manipulated variable for controlling a voltage detected by the input-side voltage sensor 18 to be the target voltage. Then, the control circuit 30 operates the switching elements SW1 to SW4 according to a manipulated variable, whichever is the smallest among the calculated manipulated variables. The master limit value Ia is determined from a view point of maintaining reliability of the DC-DC converters. In other words, for example, the master limit value Ia may be set to a current value (average current) that can maintain reliability of the DC-DC converters until the integrated activation time period of the DC-DC converters becomes equal to a specified time period (vehicle operating time period).

With this configuration, the voltage feedback control is performed until the output current of the master DC-DC 12a exceeds the master limit value Ia. When the output current of the master DC-DC 12a exceeds the master limit value Ia, the constant current control is performed to control the output current of the master DC-DC 12a to be the master limit value Ia. As a result, the output voltage of the master DC-DC 12a is reduced. In this way, the master DC-DC 12a has constant current dropping characteristics.

The control circuit 30 of the slave DC-DC 12b performs the same process as that of the control circuit 30 of the master DC-DC 12a described above. The power supply system may include a sensor for detecting the voltage across the low-voltage battery 24 or the voltage across each on-vehicle load 28. The detection value of this sensor may be used, in the process described above, instead of the detection value of the output-side voltage sensor 22.

The high-voltage system is insulated from the low-voltage system by an insulating element 36 (e.g., a photo coupler as an optical insulating element, or a pulse transformer as a magnetic insulating element), not shown. Operation signals for the switching elements SW1 to SW4 are inputted to the switching circuit 34 of the high-voltage system via the insulating element 36. The detection values derived from the input-side voltage sensor 18 and the input-side current sensor 20 are inputted to the control circuit 30 of the low-voltage system via the insulating element 36. Hereinafter is described how a target voltage or the like is set in the control over the DC-DC converters of the present embodiment.

In the present embodiment, a target voltage Va (e.g., 28 V) of the master DC-DC 12a is set to be higher than a target voltage Vb (e.g., 27 V) of the slave DC-DC 12b. For example, the target voltage Vb of the slave DC-DC 12b may be set to a value a little higher than the upper limit value of a working-voltage range of the low-voltage battery 24.

It should be appreciated that the reason why the target voltage Va of the master DC-DC 12a is made different from the target voltage Vb of the slave DC-DC 12b is to prevent increase in the size and cost of the DC-DC converters. Specifically, for example, from the viewpoint of enhancing reliability of the DC-DC converters, it is desirable that the DC-DC converters are operated such that current to be supplied to the on-vehicle loads 28, the vehicle ECU 26 and the low-voltage battery 24 (hereinafter this current is referred to a "requested current of the vehicle") is equally imposed on the master DC-DC 12a and the slave DC-DC 12b. Therefore, for example, the target voltages of the master DC-DC 12a and the slave DC-DC 12b may be set to the same value.

However, in this case, there are concerns that: the output voltages may be varied depending on the individual differences of the DC-DC converters, which are induced such as by the differences in the speed of transmitting signals from the switching circuit 34 to the switching elements SW1 to SW4; either one of the master DC-DC 12a and the slave DC-DC 12b may have a higher frequency of being activated because, of these two DC-DC converters connected in parallel to each other, the one with a higher output voltage is preferentially activated to output current to the on-vehicle loads 28 and the like; and it may be difficult to detect which of the DC-DC converters is activated. Therefore, in order to cope with these concerns, a current value (e.g., rated current) that guarantees reliability of each DC-DC converter is required to be increased in designing the DC-DC converter. Accordingly, the transformer 14, the switching elements SW1 to SW4, and the like, in the DC-DC converter are required to deal with high current. Thus, this may lead to the necessity of newly developing switching elements, and the new development may involve increase in the cost and size of each DC-DC converter.

In order to eliminate such problems, the target voltage of the master DC-DC 12a is made different from that of the slave DC-DC 12b. Thus, which of the DC-DC converters should output current to the vehicle is made clear according to the requested current of the vehicle, thereby preventing increase in the size and cost of each DC-DC converters.

In the present embodiment, the specified value suitable for the slave DC-DC 12b (hereinafter referred to as a slave limit value Ib) is set to a maximum current (e.g., 80 A) that can be outputted by the slave DC-DC 12b. Also, the master limit value Ia is set to a value smaller (e.g., 35 A) than the slave limit value Ib. Setting values in this way can contribute to enhancing reliability of the power supply system. Specifically, when the requested current of the vehicle becomes large, a part of the requested current is supplied, at an earlier stage, from the slave DC-DC 12b in addition to the master DC-DC 12a. Thus, the requested current of the vehicle is shared between the master DC-DC 12a and the slave DC-DC 12b as equally as possible.

In addition, this configuration can reduce current passing through the DC-DC 12a, as the master limit value Ia becomes smaller with respect to the slave limit value Ib. Further, this configuration can impose a part of the requested current on the slave DC-DC 12b at an earlier stage when the requested current becomes larger. Accordingly, the life of the master DC-DC 12a is prevented from becoming short.

Further, in the present embodiment, an overcurrent limiting signal is outputted to the control circuit 30 of the master DC-DC 12a via the vehicle ECU 26, when the control circuit 30 of the slave DC-DC 12b determines that the output current of the slave DC-DC 12b exceeds the slave limit value Ib. The control circuit 30 of the master DC-DC 12a, when it determines that an overcurrent limiting signal has been received, performs a process of increasing the master limit value Ia. In the present embodiment, the control circuit 30 of the master DC-DC 12a increases the master limit value Ia to a maximum current (e.g., 80 A) Ic that can be outputted by the master DC-DC 12a. This process corresponds to a process of increasing a maximum value of current that can be supplied to the on-vehicle loads 28 and the like by the power supply system, when the requested current of the vehicle is increased.

In the present embodiment, an overcurrent limiting signal is transmitted via interfaces (pin terminals Ta and Tb) provided in the master DC-DC 12a and the slave DC-DC 12b, which interfaces are able to transmit/receive signals. The power supply system according to the present embodiment makes use of DC-DC converters of conventional art. Accordingly, the number of pin terminals used for purposes other than the purpose of transmitting an overcurrent limiting signal is smaller than the total number of pin terminals provided to the DC-DC converters. Thus, of all of the pin terminals, the unused pin terminals Ta and Tb are used for transmitting an overcurrent limiting signal.

Figure 2:
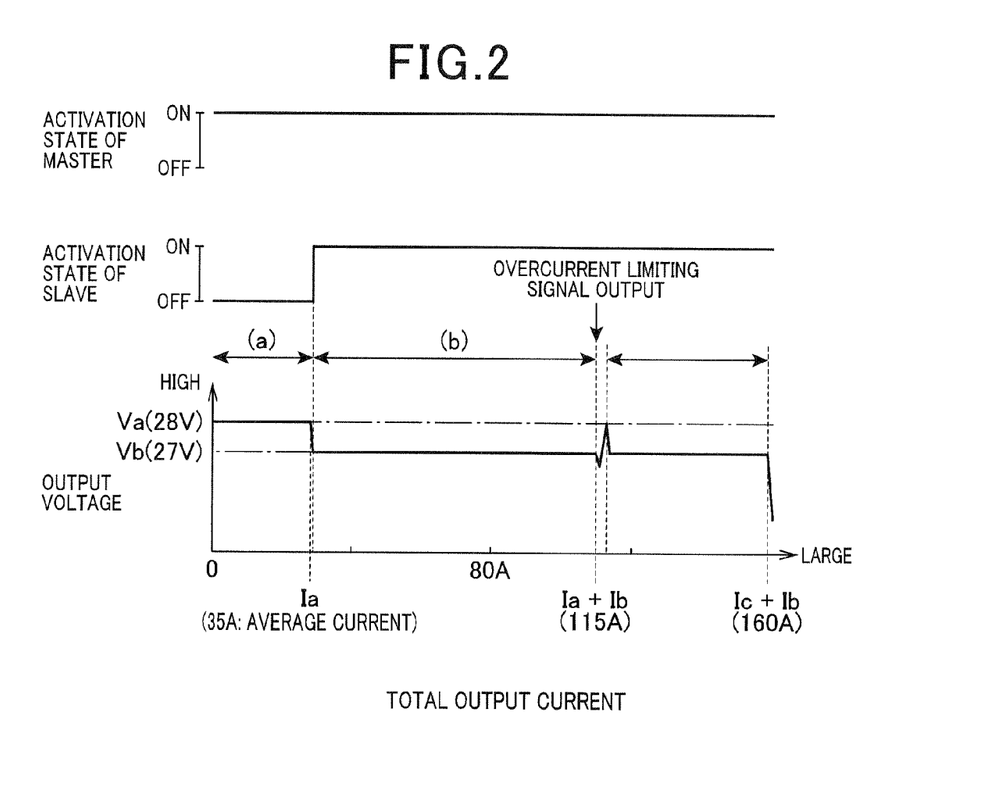
FIG. 2 is a diagram showing a mode of control over DC-DC converters in the power supply system of FIG. 1.

Referring now to FIG. 2, the above process mode performed by the control circuit 30 is more specifically described.

As shown by (a) in FIG. 2, current is outputted from the master DC-DC 12a alone under the voltage feedback control, until the output current (requested current of the vehicle) of the master DC-DC 12a exceeds the master limit value Ia. Then, when the output current of the master DC-DC 12a exceeds the master limit value Ia, the output current of the master DC-DC 12a is fixed to the master limit value Ia under the constant current control. As a result, the output voltage of the master DC-DC 12a is reduced.

After that, as shown by (b) in FIG. 2, fixation of the output current of the master DC-DC 12a to the master limit value Ia is maintained while a share of current, excepting the share to be imposed on the master DC-DC 12a, is imposed on the slave DC-DC 12b. This state continues from when the output voltage of the master DC-DC 12a is reduced to the target voltage Vb of the slave DC-DC 12b until when the total output current of the master DC-DC 12a and the slave DC-DC 12b (the requested current of the vehicle) exceeds the total value (115 A) of the master limit value Ia and the slave limit value Ib. While this state continues, the slave DC-DC 12b is subjected to voltage feedback control.

When the output current of the slave DC-DC 12b exceeds the slave limit value Ib (when the total output current exceeds the total value of the master limit value Ia and the slave limit value Ib), the output current of the slave DC-DC 12b is fixed to the slave limit value Ib under the constant current control. As a result, the output voltage of the slave DC-DC 12b is reduced. At the same time with this, an overcurrent limiting signal is outputted from the slave DC-DC 12b to the master DC-DC 12a.

Upon reception of the overcurrent limiting signal, the DC-DC 12a increases the master limit value Ia to the maximum current Ic (80 A). Thus, for the master DC-DC 12a, the constant current control is switched to the voltage feedback control for a short time. Due to this, of the requested current of the vehicle, the master limit value Ic is covered by the master DC-DC 12a, while the remnant is covered by the slave DC-DC 12b. In other words, the output current of the master DC-DC 12a is reversed with the output current of the slave DC-DC 12b.

After that, when the requested current of the vehicle gradually increases so that the total output current exceeds the total value (160 A) of the master limit value Ic and the slave limit value Ib, the total output current of the master DC-DC 12a and the slave DC-DC 12b is fixed to the total value. Accordingly, under the constant current control of the master DC-DC 12a and the slave DC-DC 12b, the output voltages of the DC-DC converters 12a and 12b are reduced.

In the present embodiment, when the vehicle ECU 26 determines that the total output current exceeds the total value of the master limit value Ic and the slave limit value Ib, the vehicle ECU 26 carries out a process of limiting the requested value of the vehicle, or a process of notifying the driver of the fact that the requested current of the vehicle is large. Specifically, for example, the process of limiting the requested current may be carried out by reducing power consumption of the on-vehicle loads 28 involved in low-priority operations, or inhibiting the increase of the power consumption.

Further, in the present embodiment, when the requested current of the vehicle is determined to fall below a threshold (e.g., 25 A) which is smaller than the master limit value Ia prior to increase, the master limit value Ia is restored to the maximum current Ic. The reason why the threshold is set to a value smaller than the master limit value Ia is to prevent frequent switch of the master limit value Ia due to the variation of the requested current of the vehicle in the vicinity of Ia.

Figure 3A:
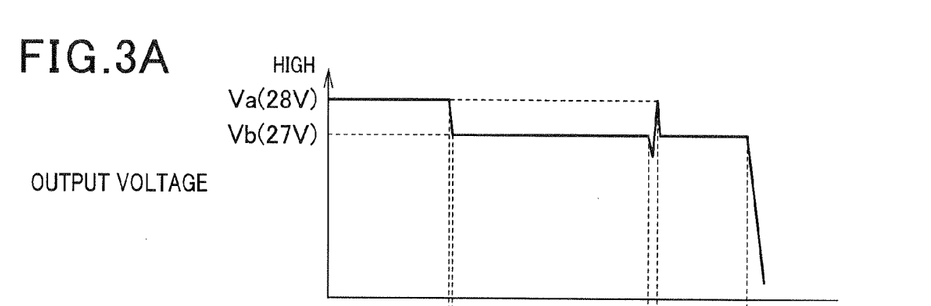
FIGS. 3A to 3E are diagrams showing a mode of control over the DC-DC converters in the power supply system of FIG. 1.
Figure 3B:
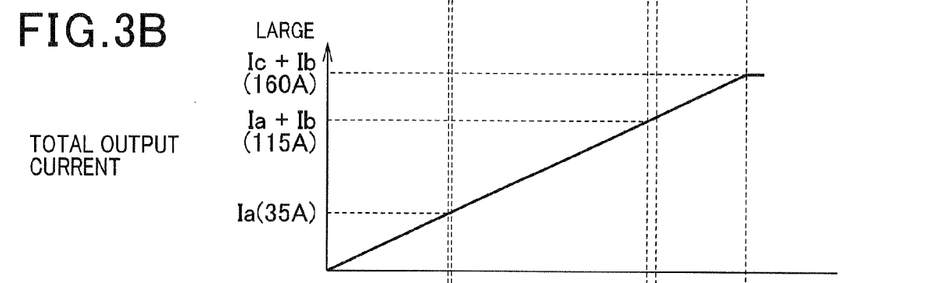
Figure 3C:
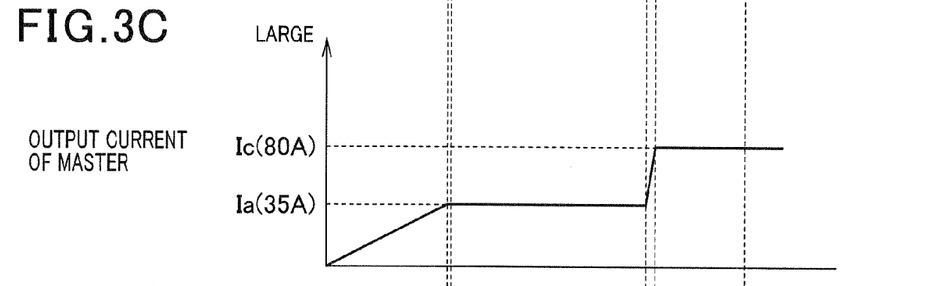
Figure 3D:
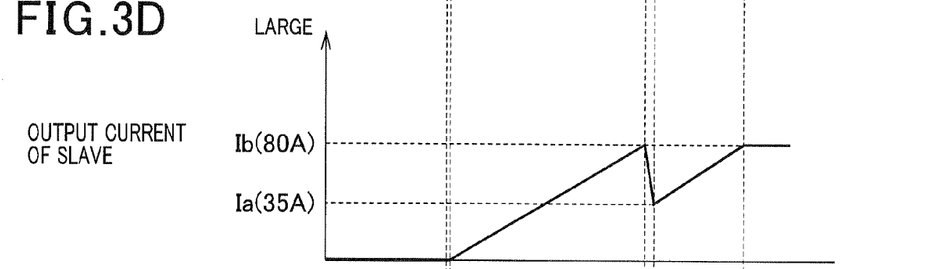
Figure 3E:
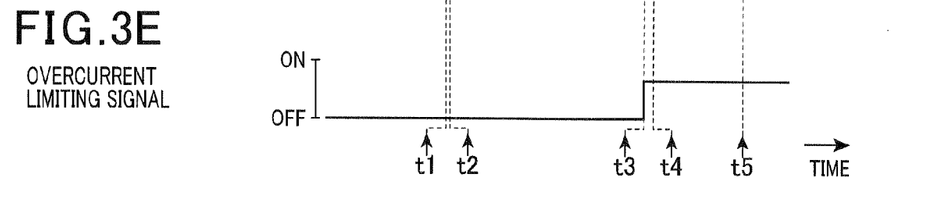

Referring to the timing diagrams of FIGS. 3A to 3E, an example of the above process mode performed by the control circuit 30 is given below. FIG. 3A shows transition of the output voltage in the parallel connection of the master DC-DC 12a and the slave DC-DC 12b. FIG. 3B shows transition of the total output current of the master DC-DC 12a and the slave DC-DC 12b. FIG. 3C shows transition of the output current of the master DC-DC 12a alone. FIG. 3D shows transition of the output current of the slave DC-DC 12b alone. FIG. 3E shows transition of a state of outputting an overcurrent limiting signal from the slave DC-DC 12b to the master DC-DC 12a. FIGS. 3A to 3E show conditions where the requested current of the vehicle gradually increases with time.

As shown, a current suitable for the requested current of the vehicle is outputted from only the master DC-DC 12a until time t1 when the total output current reaches the master limit value Ia. Then, at time t1, when the output current of the master DC-DC 12a exceeds the master limit value Ia, the output current of the master DC-DC 12a is fixed to the master limit value Ia. Thus, the output voltage of the master DC-DC 12a is reduced.

Then, at time t2, when the output voltage of the master DC-DC 12a is reduced to the target value Vb, the slave DC-DC 12b starts output of current. Then, at time t3, when the output current of the slave DC-DC 12b exceeds the slave limit value Ib (when the total output current exceeds the total value of the master limit value Ia and the slave limit value Ib), the output current of the slave DC-DC 12b is fixed to the slave limit value Ib. Accordingly, the output voltage of the slave DC-DC 12b is reduced. At the same time, an overcurrent limiting current is outputted from the slave DC-DC 12b.

Upon reception of the overcurrent limiting signal, the master DC-DC 12a performs the process of increasing the master limit value Ia. Thus, at time t4, the output current of the master DC-DC 12a becomes equal to the master limit value Ic. After that, when the requested current of the vehicle is gradually increased and the total output current exceeds the total value (160 A) of the master limit value Ic and the slave limit value Ib, the output current of each of the master DC-DC 12a and the slave DC-DC 12b is fixed. Thus, the output voltage of each of the master DC-DC 12a and the slave DC-DC 12b is reduced.

A fault may occur in the power supply system, disabling transmission of an overcurrent limiting signal from the slave DC-DC 12b to the master DC-DC 12a. In this case, for example, the fault may be ascribed to disconnection, short circuiting or the like in a signal line for transmitting the overcurrent limiting signal, or output disconnection on the side of the slave DC-DC 12b, which disables the output of the overcurrent limiting signal. In the occurrence of such a fault, the output voltage of the master DC-DC 12a and the slave DC-DC 12b becomes lower than the target voltage Vb of the slave DC-DC 12b because the master limit value Ia remains as it is and thus the requested current of the vehicle increases. In other words, in the occurrence of such a fault, the output voltage of the DC-DC converters 12a and 12b may be drastically reduced.

In this regard, in the present embodiment, when the output voltage of the master DC-DC 12a becomes equal to a predetermined voltage Vc which is lower than the target voltage Vb of the slave DC-DC 12b, the master DC-DC 12a performs a process of increasing the master limit value from Ia to Ic (voltage-reduction-suppressing process). Thus, the output voltage of the master DC-DC 12a and the slave DC-DC 12b is maintained at the predetermined voltage Vc. In other words, the above process performed by the master DC-DC 12a can favorably prevent the output voltage of the DC-DC converters 12a and 12b from being drastically reduced.

After the increase of the master limit value in the mode described above, the output voltage of the master DC-DC 12a may become equal to the target value Vb of the slave DC-DC 12b. In this case, the increased master limit value may be restored from Ic to Ia.

According to the present embodiment specifically described so far, the following advantages are obtained.

(1) In the power supply system for supplying power to the on-vehicle loads 28 and the like using the parallel connection of the master DC-DC 12a and the slave DC-DC 12b, when the output current of the slave DC-DC 12b exceeds the slave limit value Ib, an overcurrent limiting signal is outputted from the slave DC-DC 12b to the master DC-DC 12a. Then, upon reception of the overcurrent limiting signal, the master DC-DC 12a performs a process of increasing the master limit value from Ia to Ic. Thus, the reliability of the power supply system is favorably enhanced, while a maximum value of current that can be supplied to the on-vehicle loads 28 and the like is increased.

Further, the power supply system is designed on the basis of changing a control logic related such as to the increase of a master limit value and of providing a simple information transmitting unit using the pin terminals Ta and Tb. Thus, a power supply system having a high performance in supplying current such as to the on-vehicle loads 28 and having high reliability is appropriately realized using DC-DC converters of conventional art.

(2) The master limit value Ia is set to the average current of the master DC-DC 12a, while the master limit value Ia is set to a value smaller than the slave limit value Ib. Thus, a part of the requested current of the vehicle is imposed on the slave DC-DC 12b as early as possible. Accordingly, the requested current of the vehicle is imposed as equally as possible on the master DC-DC 12a and the slave DC-DC 12b in a period in which the requested current of the vehicle does not become excessively large. Thus, the master DC-DC 12a and the slave DC-DC 12b are actuated as much as possible with a current of not more than the average current. Further, reliability of the power supply system is favorably enhanced.

(3) When the vehicle ECU 26 determines that the total output current of the master DC-DC 12a and the slave DC-DC 12b exceeds the total value of the master limit value Ic and the slave limit value Ib, the vehicle ECU 26 is ensured to carry out a process, for example, of limiting the requested current of the vehicle. This contributes, for example, to preventing continuation of a state where the output current of the master DC-DC 12a and the slave DC-DC 12b becomes excessively large, or contributes to having the driver take appropriate measures thereafter.

(4) When the output voltage of the master DC-DC 12a becomes equal to the predetermined voltage Vc, the master DC-DC 12a performs the voltage-reduction-suppressing process to increase the master limit value from Ia to Ic. Thus, the output voltage of the master DC-DC 12a and the slave DC-DC 12b is favorably prevented from being drastically reduced.

(Modifications)

The embodiment described above may be modified and implemented as follows.

In the embodiment described above, the master limit value Ia is set to a value smaller than the slave limit value Ib. Alternative to this, for example, the master limit value Ia may be set to a value larger than the slave limit value Ib. This configuration may be applied to a power supply system including differently structured master DC-DC 12a and slave DC-DC 12b, in which the average current of the master DC-DC 12a is larger than the average current of the slave DC-DC 12b.

Further, for example, the master limit value Ia and the slave limit value Ib may be set to the same value. In this case, the limit value of both of the master DC-DC 12a and the slave DC-DC 12b may be set to the average current (e.g., 35 A). Also, in this case, a process of increasing the master limit value Ia may include, for example: increasing the master limit value from Ia to Ic (e.g., 80 A) when the output current of the slave DC-DC 12b exceeds the slave limit value Ib after the output current of the master DC-DC 12a has once exceeded the master limit value Ia; and, then, increasing the slave limit value Ib (e.g., to 80 A) when the output current of the master DC-DC 12a exceeds the master limit value Ic.

The number of DC-DC converters connected in parallel to each other is not limited to two but may be three or more. In this case, one of the plurality of DC-DC converters may be permitted to serve as a master DC-DC and others may be permitted to serve as slave DC-DCs.

A process of increasing the specified value in the above configuration is explained here, taking as an example the case where, of the slave DC-DCs, a slave DC-DC with a lowest target voltage has an output current that exceeds a specified value suitable for the slave DC-DC. In this case, the specified values of other slave DC-DCs than the slave DC-DC having a lowest target voltage among all of the slave DC-DCs may be sequentially increased, followed by increasing the specified value suitable for the master DC-DC.

More specifically, for example, when, of the slave DC-DCs, a slave DC-DC with a lowest target voltage has an output current that exceeds a specified value suitable for the slave DC-DC, the specified values of the slave DC-DCs other than the slave DC-DC having a lowest target voltage are increased in ascending order of the target voltages when the respective output currents exceed the respective specified values. Then, after increasing all of the specified values suitable for the respective slave DC-DCs other than the slave DC-DC having a lowest target voltage, the specified value suitable for the master DC-DC is increased. In the above configuration, when the output current of a DC-DC converter exceeds the specified value suitable for the DC-DC converter, an overcurrent limiting signal is outputted to a DC-DC converter having a second largest target voltage with respect to the DC-DC converter in question.

In the embodiment described above, the target voltage of the master DC-DC 12a is made different from that of the slave DC-DC 12b. However, alternative to this, these DC-DC converters 12a and 12b may have the same target voltage. An example of a process of increasing the master limit value Ia and the slave limit value Ib in this case is explained below.

First, the master limit value Ia and the slave limit value Ib here are set to the same average current (e.g., 35 A). Then, the master DC-DC 12a and the slave DC-DC 12b are permitted to communicate with each other.

Since the master DC-DC 12a and the slave DC-DC 12b both have the same target voltage, it is difficult to detect, as described above, which of these DC-DC converters is activated first, due to variation, for example, of the output voltage between these DC-DC converters. For this reason, when either of the master DC-DC 12a and the slave DC-DC 12b has its output current exceeding a limit value suitable for itself, an overcurrent limiting signal is outputted from one DC-DC converter whose output current exceeds the limit value to the other DC-DC converter. Then, in the DC-DC converter that has received the overcurrent limiting signal, the limit value suitable for itself is increased (from 35 A to 80 A).

After that, output of current is started from the DC-DC converter which has the increased limit value. Then, when the output current of the DC-DC converter, in which the limit value has been increased, exceeds the limit value (80 A) due to further increase of the requested current, an overcurrent limiting signal is outputted to the other DC-DC converter. Then, in the DC-DC converter that has received the overcurrent limiting signal, the limit value suitable for itself is increased (from 35 A to 80 A).

With this configuration, unless the requested current exceeds the sum (70 A) of the master limit value Ia and the slave limit value Ib, the output current of these DC-DC converters is rendered to be not more than the average current. On the other hand, when the sum exceeds the requested current, the limit value suitable for at least one of the master DC-DC 12a and the slave DC-DC 12b is increased. Thus, the increase of the requested current is appropriately coped with, while reliability of the power supply system is enhanced.

Hereinafter is explained the voltage-reduction-suppressing process performed in a power supply system having three or more DC-DC converters connected in parallel to each other. The process is performed in the occurrence of a fault that disables transmission of an overcurrent limiting signal from the slave DC-DC 12b to the master DC-DC 12a, such as when disconnection or short circuiting occurs in a signal line for transmitting the overcurrent limiting signal. In the power supply system, of the plurality of DC-DC converters, one is permitted to serve as a master DC-DC and others are permitted to serve as slave DC-DCs. Of the slave-DC-DCs, the one having a lowest target voltage is rendered to be a final slave and the remaining slave DC-DCs are rendered to be intermediate slaves. In this case, when the output voltage of at least one of the master DC-DC and the intermediate slaves is found to be lower than a specified voltage (voltage lower than the target voltage of the final slave), the DC-DC converter that has been found to have an output voltage lower than the specified voltage among the master DC-DC and the intermediate slave DC-DCs may be increased with the limit value suitable for itself.

The process of transmitting an overcurrent limiting signal is not limited to the one exemplified in the above embodiment. For example, an overcurrent limiting signal may be directly transmitted from the slave DC-DC 12b to the master DC-DC 12a via the pin terminals Ta and Tb. In this case, it is desirable that the master DC-DC 12a outputs information regarding the reception of the overcurrent limiting signal to the vehicle ECU 26.

The switching elements provided to the DC-DC converters are not limited to MOS transistors but may, for example, be IGBTs (insulated gate bipolar transistors).

The DC-DC converters are not limited to step-down converters but may be step-up converters.

What is claimed is:

1. A power supply system comprising:
operating means that operates a plurality of DC-DC converters connected in parallel to one another such that power is supplied through the plurality of DC-DC converters to a predetermined power-supplied object, the plurality of DC-DC converters including a first DC-DC converter and a second DC-DC converter, the first DC-DC converter being at least one of the plurality of DC-DC converters, the second DC-DC converter being at least one of the plurality of DC-DC converters other than the first DC-DC converter, wherein the operating means includes
voltage controlling means that operates the plurality of DC-DC converters such that output voltages thereof are controlled to be respective target voltage, and
current limiting means that limits output currents of the plurality of DC-DC converters so that they are prevented from increasing beyond respective specified value of non-zero current value, the first DC-DC converter having the specified value that is set to a first specified value of non-zero current value, the second DC-DC converter having the specified value that is set to a second specified value of non-zero current value,
the power supply system further comprising increasing means that increases the second specified value of the second DC-DC converter to a third specified value of non-zero current value, when all of the plurality of DC-DC converters are activated and output current of the first DC-DC converter reaches the first specified value of the first DC-DC converter.

2. The power supply system according to claim 1, wherein:
the plurality of DC-DC converters are different in the target voltage from one another, and which include a master and at least one slave, the master being a DC-DC converter having a highest target value among the plurality of DC-DC converters, and the at least one slave being at least one DC-DC converter other than the master among the plurality of DC-DC converters; and
the increasing means increases the specified value for at least one DC-DC converter among the plurality of DC-DC converters other than a slave having a lowest target value among the at least one slave, when output current of the slave having the lowest target value reaches the specified value for the slave.

3. The power supply system according to claim 2, wherein:
the plurality of DC-DC converters are different in the target voltage from one another, and include a master and at least one slave, the master being a DC-DC converter having a highest target value among the plurality of DC-DC converters, and the slave being at least one DC-DC converter other than the master among the plurality of DC-DC converters; and
the increasing means increases the specified value for at least one DC-DC converters among the plurality of DC-DC converters other than a slave having a lowest target value among the plurality of DC-DC converters, when output voltage of the at least one DC-DC converters other than the slave having the lowest target value becomes lower than that of the slave.

4. The power supply system according to claim 3, wherein the specified value related to the master is set to be lower than the specified value related to the slave having the lowest target.

5. The power supply system according to claim 3, wherein:
the operating means is provided for each of the plurality of DC-DC converters, and operates the respective DC-DC converter;
the increasing means is provided for at least one DC-DC converter other than a DC-DC converter having a lowest target value among the plurality of DC-DC converters;
each of the plurality of DC-DC converters is provided with an interface;
the power supply system further comprises means that, when output current of the DC-DC converter having the lowest target value reaches the specified value for the DC-DC converter, externally outputs information related to its situation via the interface related to the DC-DC converter; and the increasing means increases the specified value related to the respective DC-DC converter provided with the increasing means itself under a condition that the information is received via the interface related to the its the respective DC-DC converter.

6. The power supply system according to claim 4, wherein:

the operating means is provided for each of the plurality of DC-DC converters, and operates the respective DC-DC converter;

the increasing means is provided for at least one DC-DC converter other than a DC-DC converter having a lowest target value among the plurality of DC-DC converters;

each of the plurality of DC-DC converters is provided with an interface;

the power supply system further comprises means that, when output current of the DC-DC converter having the lowest target value reaches the specified value for the DC-DC converter, externally outputs information related to its situation via the interface related to the DC-DC converter; and the increasing means increases the specified value related to the respective DC-DC converter provided with the increasing means itself under a condition that the information is received via the interface related to the its the respective DC-DC converter.

7. The power supply system according to claim 6, wherein:

the operating means is provided for each of the plurality of DC-DC converters, and operates the respective DC-DC converter;

the power supply system and the power-supplied object are mounted in a vehicle;

the vehicle is provided with means for performing overall control of the vehicle, the means being located at an upstream side than the operating means; and the power supply system further comprises notifying means that, when output currents of the plurality of DC-DC converters exceed the respective specified value, notifies the means for performing overall control of information related to its situation.

8. The power supply system according to claim 2, wherein the specified value related to the master is set to be lower than the specified value related to the slave having the lowest target.

9. The power supply system according to claim 8, wherein:

the operating means is provided for each of the plurality of DC-DC converters, and operates the respective DC-DC converter;

the increasing means is provided for at least one DC-DC converter other than a DC-DC converter having a lowest target value among the plurality of DC-DC converters;

each of the plurality of DC-DC converters is provided with an interface;

the power supply system further comprises means that, when output current of the DC-DC converter having the lowest target value reaches the specified value for the DC-DC converter, externally outputs information related to its situation via the interface related to the DC-DC converter; and the increasing means increases the specified value related to the respective DC-DC converter provided with the increasing means itself under a condition that the information is received via the interface related to the its the respective DC-DC converter.

10. The power supply system according to claim 8, wherein:

the operating means is provided for each of the plurality of DC-DC converters, and operates the respective DC-DC converter;

the power supply system and the power-supplied object are mounted in a vehicle;

the vehicle is provided with means for performing overall control of the vehicle, the means being located at an upstream side than the operating means; and the power supply system further comprises notifying means that, when output currents of the plurality of DC-DC converters exceed the respective specified value, notifies the means for performing overall control of information related to its situation.

11. The power supply system according to claim 2, wherein:

the operating means is provided for each of the plurality of DC-DC converters, and operates the respective DC-DC converter;

the increasing means is provided for at least one DC-DC converter other than a DC-DC converter having a lowest target value among the plurality of DC-DC converters;

each of the plurality of DC-DC converters is provided with an interface;

the power supply system further comprises means that, when output current of the DC-DC converter having the lowest target value reaches the specified value for the DC-DC converter, externally outputs information related to its situation via the interface related to the DC-DC converter; and the increasing means increases the specified value related to the respective DC-DC converter provided with the increasing means itself under a condition that the information is received via the interface related to the its the respective DC-DC converter.

12. The power supply system according to claim 2, wherein:

the operating means is provided for each of the plurality of DC-DC converters, and operates the respective DC-DC converter;

the power supply system and the power-supplied object are mounted in a vehicle;

the vehicle is provided with means for performing overall control of the vehicle, the means being located at an upstream side than the operating means; and the power supply system further comprises notifying means that, when output currents of the plurality of DC-DC converters exceed the respective specified value, notifies the means for performing overall control of information related to its situation.

13. The power supply system according to claim 1, wherein:

the plurality of DC-DC converters are different in the target voltage from one another, and include a master and at least one slave, the master being a DC-DC converter having a highest target value among the plurality of DC-DC converters, and the slave being at least one DC-DC converter other than the master among the plurality of DC-DC converters; and the increasing means increases the specified value for at least one DC-DC converters among the plurality of DC-DC converters other than a slave having a lowest target value among the plurality of DC-DC converters, when output voltage of the at least one DC-DC converters other than the slave having the lowest target value becomes lower than that of the slave.

14. The power supply system according to claim 13, wherein
the specified value related to the master is set to be lower than the specified value related to the slave having the lowest target.

15. The power supply system according to claim 14, wherein:
the operating means is provided for each of the plurality of DC-DC converters, and operates the respective DC-DC converter;
the increasing means is provided for at least one DC-DC converter other than a DC-DC converter having a lowest target value among the plurality of DC-DC converters;
each of the plurality of DC-DC converters is provided with an interface;
the power supply system further comprises means that, when output current of the DC-DC converter having the lowest target value reaches the specified value for the DC-DC converter, externally outputs information related to its situation via the interface related to the DC-DC converter; and
the increasing means increases the specified value related to the respective DC-DC converter provided with the increasing means itself under a condition that the information is received via the interface related to the its the respective DC-DC converter.

16. The power supply system according to claim 13, wherein:
the operating means is provided for each of the plurality of DC-DC converters, and operates the respective DC-DC converter;
the increasing means is provided for at least one DC-DC converter other than a DC-DC converter having a lowest target value among the plurality of DC-DC converters;
each of the plurality of DC-DC converters is provided with an interface;
the power supply system further comprises means that, when output current of the DC-DC converter having the lowest target value exceeds the specified value for the DC-DC converter, externally outputs information related to its situation via the interface related to the DC-DC converter; and
the increasing means increases the specified value related to the respective DC-DC converter provided with the increasing means itself under a condition that the information is received via the interface related to the its the respective DC-DC converter.

17. The power supply system according to claim 13, wherein:
the operating means is provided for each of the plurality of DC-DC converters, and which operates the respective DC-DC converter provided with one operating means itself;
the power supply system and the power-supplied object are mounted in a vehicle;
the vehicle is provided with means for performing overall control of the vehicle, the means being located at an upstream side than the operating means; and
the power supply system further comprises notifying means that, when output currents of the plurality of DC-DC converters exceed the respective specified value, notifies the means for performing overall control of information related to its situation.

18. The power supply system according to claim 1, wherein:
the operating means is provided for each of the plurality of DC-DC converters, and operates the respective DC-DC converter;
the increasing means is provided for at least one DC-DC converter other than a DC-DC converter having a lowest target value among the plurality of DC-DC converters;
each of the plurality of DC-DC converters is provided with an interface;
the power supply system further comprises means that, when output current of the DC-DC converter having the lowest target value reaches the specified value for the DC-DC converter, externally outputs information related to its situation via the interface related to the DC-DC converter; and
the increasing means increases the specified value related to the respective DC-DC converter provided with the increasing means itself under a condition that the information is received via the interface related to the its the respective DC-DC converter.

19. The power supply system according to claim 18, wherein:
the operating means is provided for each of the plurality of DC-DC converters, and operates the respective DC-DC converter;
the power supply system and the power-supplied object are mounted in a vehicle;
the vehicle is provided with means for performing overall control of the vehicle, the means being located at an upstream side than the operating means; and
the power supply system further comprises notifying means that, when output currents of the plurality of DC-DC converters exceed the respective specified value, notifies the means for performing overall control of information related to its situation.

20. The power supply system according to claim 1, wherein:
the operating means is provided for each of the plurality of DC-DC converters, and operates the respective DC-DC converter;
the power supply system and the power-supplied object are mounted in a vehicle;
the vehicle is provided with means for performing overall control of the vehicle, the means being located at an upstream side than the operating means; and
the power supply system further comprises notifying means that, when output currents of the plurality of DC-DC converters exceed the respective specified value, notifies the means for performing overall control of information related to its situation.

21. The power supply system according to claim 1, wherein:
the first DC-DC converter is a slave DC-DC converter and the second DC-DC converter is a master DC-DC converter.

22. The power supply system according to claim 21, wherein:
the second specified value of the second DC-DC converter is less than the first specified value of the first DC-DC converter.

23. The power supply system according to claim 21, wherein:
the third specified value of the second DC-DC converter is equal to the first specified value of the first DC-DC converter.

* * * * *